United States Patent [19]

Scott et al.

[11]  4,268,540

[45]  May 19, 1981

[54] PARTICLES FOR MAGNETIC RECORDING

[75] Inventors: Lawrence M. Scott, Newark; Irving W. Wolf, Los Altos; Yu C. Lee, Newark, all of Calif.

[73] Assignee: Ampex Corporation, Redwood City, Calif.

[21] Appl. No.: 121,196

[22] Filed: Feb. 13, 1980

Related U.S. Application Data

[63] Continuation of Ser. No. 945,276, Sep. 25, 1978, abandoned, which is a continuation of Ser. No. 837,837, Sep. 29, 1977, abandoned.

[51] Int. Cl.$^3$ .............................................. B05D 5/12
[52] U.S. Cl. .................................................... 427/127
[58] Field of Search ......................................... 427/127

[56] References Cited

U.S. PATENT DOCUMENTS 4,125,474  11/1978  Dezawa et al. ..................... 427/127

*Primary Examiner*—Bernard D. Pianalto
*Attorney, Agent, or Firm*—Robert G. Clay; Robert G. Slick

[57] ABSTRACT

Improved particles for magnetic recording are provided by coating gamma ferric oxide with a mixture of barium, strontium, lead or calcium and a trivalent iron oxide. The particles have enhanced coercivity and the coercivity is relatively unaffected by elevated temperatures.

2 Claims, No Drawings

PARTICLES FOR MAGNETIC RECORDING

This is a continuation of application Ser. No. 945,276, filed Sept. 25, 1978, which is a continuation of Ser. No. 837,837, filed Sept. 29, 1977, both now abandoned.

SUMMARY OF THE INVENTION

Magnetic particles used in magnetic tapes, discs and other storage media, should have a high coercivity for high packing density recording. The high coercivity improves the output and enhances the signal-to-noise ratio.

Standard gamma ferric oxide has an undesirably low coercivity and methods have been sought to increase the coercivity, either by doping the gamma ferric oxide, or by employing materials other than gamma ferric oxide for recording.

Although such materials have enhanced coercivity, they suffer from the defect that the coercivity is highly temperature dependent, i.e. as the temperature is raised, the coercivity is lowered so that the output is not uniform; output falls off at higher temperatures.

One approach has been to dope the gamma ferric oxide with a material such as cobalt. Another approach has been to substitute chromium dioxide for the usual gamma ferric oxide. Both of these approaches result in magnetic materials having higher coercivity but suffer from the deficiency that the coercivity is highly temperature dependent.

A further advantage of the present invention is that both cobalt and chromium are relatively expensive while the coating materials of the present invention are relatively inexpensive so that a highly improved magnetic particle can be produced at a relatively low cost.

In accordance with the present invention, it has been found that if gamma ferric oxide particles are provided with a coating of an oxide selected from barium, strontium, lead and calcium mixed with trivalent iron, coercivity is increased very substantially yet the coercivity has little temperature dependence and therefore gives uniform response even at elevated temperatures.

Various other objects and features of the invention will be brought out in the balance of the specification.

DESCRIPTION OF THE PREFERRED EMBODIMENTS

The magnetic particles made in accordance with the present invention can be represented by the following formula:

$$(MO)_x(Fe_2O_3)_y(Fe_2O_3)_z$$

In the above formula, M represents a metal selected from barium, strontium, lead and calcium. The mole ratio of the first component x to the second component y is from 0.04 to 0.4 and the mole ratio of the combination of the first and second component to the third component $(x+y/z)$ is from 0.10 to 0.40. It will be understood, of course, that the magnetic particle is not homogenous but in general consists of a core of the third component z with a coating of a mixture of the first component and the second component. The coating, of course, will not be in a discreet layer but there will be some diffusion of one layer into the next.

The coating contains ions of the family barium, strontium, lead and calcium which are known to form magnetoplumbite structures when combined with iron oxides and heated to sufficiently high temperatures. These materials are added as a soluble salt such as the acetate, nitrate or the like. Similarly, the iron is added a soluble trivalent salt such as ferric chloride. The addition of an alkali causes the material to form a precipitate which is filtered, dried and annealed at a temperature of at least 300° F. and preferably at a temperature from 600° to 1000° F.

The following non-limiting examples illustrate preferred embodiments of the invention.

EXAMPLE 1

A quantity of 175 grams of acicular gamma ferric oxide was added to 3 liters of purified water and the mixture was heated to 180° F. under agitation. Then 13.4 grams barium acetate is dissolved in 200 ml water and added to the heated mixture. Then there was added 170.3 grams $FeCl_3 6H_2O$ dissolved in 400 ml water and 2 ml HCl. Then there was added 160 grams NaOH dissolved in 400 ml $H_2O$. The temperature was then raised to 200° F. and held at this temperature for one hour. The mixture was then cooled and filtered and was washed with water and dried. The dried material was then heated to 900° F. under an atmosphere of air and held at this temperature for one hour. The material was cooled and removed from the furnace.

EXAMPLE 2

Same as Example 1 but add 8.6 g of $Sr(NO_3)_2$ instead of barium acetate.

EXAMPLE 3

Same as Example 1 but add 19.9 g of $Pb(OAc)_2 3H_2O$ instead of barium acetate.

EXAMPLE 4

Same as Example 1 but add 4.5 g of $CaCl_2$ instead of barium acetate.

The magnetic particles were then dispersed in a resinous binder and coated on a plastic backing material to make a magnetic tape utilizing standard tape making techniques. The coercivity, temperature dependence of coercivity and print-thru were then measured. Similar tapes were made from the precursor gamma ferric oxide, and two commercially available cobalt doped magnetic oxides known as Comag and Coaxide as well as chromium dioxide and the results are set forth in table I.

TABLE I

| Oxide | Coating Material | Mole ratio $x + y/z$ $MO_x(Fe_2O_3)y$ | Mole ratio x/y | Coercivity* Tape (Oe) | Temp. Dependence $Hc/O_c$ | Print-thru** Constant |
|---|---|---|---|---|---|---|
| Example 1 | $BaO_x (Fe_2O_3)y$ | 0.34 | 0.17 | 460 | −0.47 | 78 |
| Example 2 | $SrO_x (Fe_2O_3)y$ | 0.32 | 0.13 | 430 | −0.50 | — |
| Example 3 | $PbO_x (Fe_2O_3)y$ | 0.33 | 0.16 | 375 | −0.43 | — |
| Example 4 | $CaO_x (Fe_2O_3)y$ | 0.32 | 0.13 | 402 | −0.36 | — |
| PM-226 | None (Precursor) | 0 | 0 | 314 | −0.40 | 77 |
| PM-085 | Comag | 0 | 0 | 550 | −2.9 | 65 |
| PM-076 | Coaxide | 0 | 0 | 500 | −6.0 | 64 |

TABLE I-continued

| Oxide | Coating Material | Mole ratio x + y/z $MO_x(Fe_2O_3)y$ | Mole ratio x/y | Coercivity* Tape (Oe) | Temp. Dependence $Hc/O_c$ | Print-thru** Constant |
|---|---|---|---|---|---|---|
| $CrO_2$ | None | 0 | 0 | 475 | −1.5 | 82 |

*Maximum $H_{app}$ = 5KOe D.C.
**Described in paper by M.K. Stafford - IEEE Transactions on Magnetics September 1976-P583-584. Basically the higher the number the better the print-thru by a corresponding amount.

The following examples illustrate the effect of varying the ratio of the coating materials and also the effect of varying the total quantity of the coating with respect to gamma ferric oxide.

EXAMPLE 5

Same as Example 1 but add 6.7 g of $Ba(OAc)_2$ instead of 13.4 g.

EXAMPLE 6

Same as Example 1 but add 3.4 g of $Ba(OAc)_2$ instead of 13.4 g.

EXAMPLE 7

Same as Example 1 but add 3.4 g of $Ba(OAc)_2$ instead of 13.4 g. Also add 42.6 g $FeCl_3 6H_2O$ instead of 170.3.

EXAMPLE 8

Same as Example 1 but add 85.2 g of $FeCl_3 6H_2O$ instead of 170.3.

Tapes were made and tested as previously described with the following results:

| Example # | Coating Material | Mole Ratio x + y/z | Mole Ratio x/y | Tape Coercivity |
|---|---|---|---|---|
| 1 | BaOx $(Fe_2O_3)y$ | 0.34 | 0.17 | 460 |
| 5 | BaOx $(Fe_2O_3)y$ | 0.31 | 0.08 | 398 |
| 6 | BaOx $(Fe_2O_3)y$ | 0.30 | 0.04 | 357 |
| 7 | BaOx $(Fe_2O_3)y$ | 0.08 | 0.17 | 364 |
| 8 | BaOx $(Fe_2O_3)y$ | 0.19 | 0.33 | 418 |

The following example illustrates the effect of various annealing temperatures on coercivity:

EXAMPLE 9

The particles were prepared as in Example 1 except that they were annealed for 1 hour at various temperatures in air. The data show 600°–1000° F. to possess the most desired annealing range, but the coercivity starts improving as low as 300° F.

| Temperature (°F.) | Tape Hc |
|---|---|
| 300 | 365 |
| 400 | 380 |
| 500 | 390 |
| 600 | 415 |
| 700 | 428 |
| 800 | 425 |
| 900 | 435 |
| 1000 | 445 |
| 1100 | 419 |
| 1200 | 345 |

Although various specific examples have been given, these are for purposes of illustration only and many variations can be made without departing from the spirit of this invention.

I claim:

1. The process of making magnetic particles consisting essentially of the following steps:
   a. forming a suspension of acicular gamma ferric oxide in an aqueous solution of a salt of a metal selected from the group consisting of barium, strontium, lead and calcium, and a soluble trivalent iron salt, adding an alkali to form a precipitate and drying the resulting mixture of the precipitated decomposition products of said salts and acicular gamma ferric oxide,
   b. heating said dry mixture in an atmosphere containing oxygen at a temperature of at least 300° F. to produce a magnetic particle having a core of acicular gamma ferric oxide and a coating comprising a mixture of an oxide of metal selected from barium, strontium, lead and calcium and trivalent iron oxide.

2. The process of claim 1 wherein quantities of the starting materials are selected to yield a product having the composition $$(MO)_x(Fe_2O_3)_y(Fe_2O_3)_z$$

wherein M is the metal selected from barium, strontium, lead and calcium, $(Fe_2O_3)_y$ is the oxide formed by the trivalent iron salt and $(Fe_2O_3)_z$ is the gamma ferric oxide and wherein the ratio of x to z is from 0.04 to 0.2 and the ratio of x+y/z is from 0.1 to 0.4.

* * * * *